Oct. 25, 1966      P. TENENBAUM      3,281,177
LOCKING MECHANISM FOR TRAILER SIDE DOOR
Filed Oct. 14, 1964      3 Sheets-Sheet 1

INVENTOR.
PAUL TENENBAUM
BY
Millman and Jacobs
ATTORNEYS

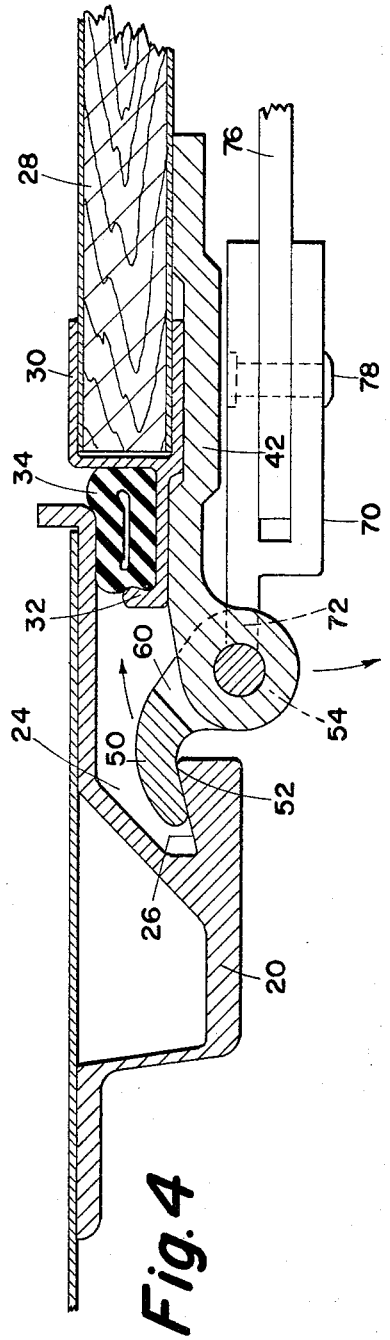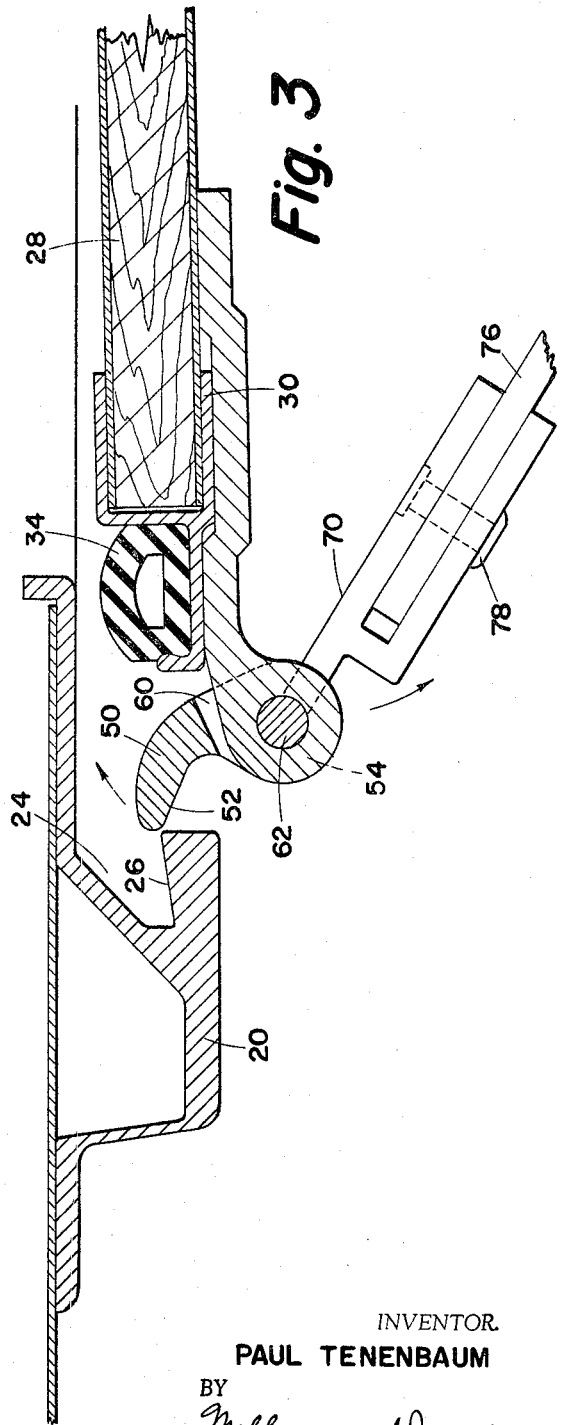

Oct. 25, 1966     P. TENENBAUM     3,281,177

LOCKING MECHANISM FOR TRAILER SIDE DOOR

Filed Oct. 14, 1964     3 Sheets-Sheet 3

INVENTOR.
PAUL TENENBAUM
BY
Millman and Jacobs
ATTORNEYS

United States Patent Office 3,281,177
Patented Oct. 25, 1966

3,281,177
LOCKING MECHANISM FOR TRAILER SIDE DOOR
Paul Tenenbaum, Glenside, Pa., assignor to Strick Corporation, Fairless Hills, Pa., a corporation of Pennsylvania
Filed Oct. 14, 1964, Ser. No. 403,895
8 Claims. (Cl. 292—241)

This invention relates to a locking mechanism for a vehicle door, particularly a trailer side door.

The primary object of this invention is to provide a manually operable lock for a vehicle door wherein the locking engagement is made at substantially flat elongated surfaces from which several advantages result. First, a substantial saving in cost is effected because effective locking action can be obtained without the necessity of providing close tolerances between the door and the doorway. Second, the locking pressure of the door in the doorway is increased.

Another object of the invention is to provide a locking mechanism for a trailer side door whose locking bar and keeper are substantially as long as the door, which bar and keeper include substantially flat engaging surfaces so that uniform locking pressure is applied along the length of the door while permitting lateral tolerances between the door and the doorway.

Another object of the invention is to provide a locking mechanism for a trailer side door of the character described including a handle secured to the locking bar which is movable towards the door to operate the same and a compressible sealing strip around the door whereby the interengagement of the flat surfaces of the keeper and locking bar and movement of the handle towards the door will compress the sealing strip between the door and the frame of the doorway to provide a water-tight fit while permitting lateral tolerance between said door and the doorway.

These and other objects of the invention will become more apparent as the following description proceeds in conjunction with the accompanying drawings wherein:

FIG. 3 is an enlarged sectional view taken on the line 3—3 of FIG. 2 of the instant locking mechanism shown in an open position;

FIG. 4 is an enlarged sectional view taken on the line 3—3 of FIG. 2 of the instant locking mechanism shown in a locked or closed position;

Specific reference is now made to the drawings in which similar reference characters are used for corresponding elements throughout.

Figure 1:
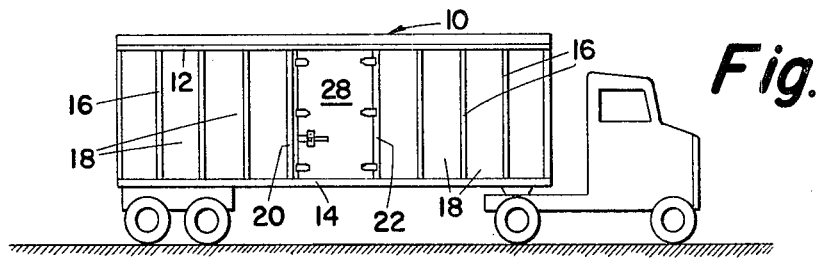
FIG. 1 is a side elevational view of a trailer body embodying the locking mechanism of the instant invention shown in a locked or closed position.

Indicated generally at 10 is a conventional semi-trailer whose body is constructed, among other things, of longitudinal upper or roof rails 12, longitudinal lower rails 14, vertical supports posts 16 secured between the upper and lower rails and side panels or sheets 18 secured to and between the posts. Generally, the posts are equally spaced longitudinally along the trailer body. The removal of one of the posts and the side panels secured on each side thereof provides a doorway in the side of the trailer. Two vertical posts 20 and 22 serve as the vertical portions of a frame for the doorway and the top and bottom rails 12 and 14, respectively, may serve as the horizontal portions of the frame where the door extends the full height of the trailer body. The vertical post 20 is the same as the other posts, which are generally hat-shaped in cross-section, except that it is also provided with a vertically extending keeper recess 24 which opens towards and along the side of the trailer and includes therein a substantially flat surface 26 which faces and is inclined inwardly of the trailer body, as seen in FIGS. 3 and 4.

The door 28 is preferably a substantially rectangular flat metal-clad member to whose periphery are secured frames 30 having channel portions 32 which face inwardly towards the trailer body and which carry rubber sealing strips 34. It will be noted from FIG. 3 that the sealing strips are enlarged or bulge when the door is unlocked and are compressed when the door is locked, as seen in FIG. 4, against the door frame.

The door 28 is secured to frame post 22 by hinges 36 and is adapted to swing out from the plane of the side of the trailer about a vertical axis through the hinges. The hinges 36 are vertically spaced and attached along the frame post 22 by suitable brackets 38 and to the outer face of the door by suitable brackets 40 along one vertical edge thereof. Vertically spaced hinge brackets 42 are secured by suitable fasteners 44 adjacent the other vertical edge of the outer face of the door 28 and include vertically extending bores 46 for journaling the locking bar 48 of the locking mechanism.

The locking bar 48 is hinged around a vertical axis which extends through the center of the journals 46 and includes an angulated latching lip 50 which extends laterally beyond and is substantially coextensive with the left vertical edge of the door 28. The latching lip 50 has a substantially flat surface 52 which faces outwardly away from the trailer body and is adapted to engage the flat surface 26 of recess 24 in frame post 20 when the locking bar is moved into the locking position. The locking bar 48 also includes a split collar 54 which extends opopsitely from and is preferably integral with the latching lip 50 and which includes a cylindrical vertically extending bore 56 and a vertically extending slit 58. The split collar 54 is discontinuous as it extends along the length of the locking bar thereby providing longitudinally spaced cut-out portions 60. Above and below each of the cut-out portions 60, holes 61 are provided in collar 54 for a purpose soon to appear.

The locking bar 48 is mounted on hinge brackets 42 by means of rods 62 which extend through journals 46 and the top and bottom portions 64 and 66 of each of the rods extend into the cylindrical bore 56 of collar 54 on both sides of the cut-out portion 60. Rods 62 are secured in place within cylindrical bore 56 by self tapping screws 68 which are extended into the bore 56 through holes 61 adjacent the top and bottom edges of each of the rods 62. So mounted, the locking bar is rotatable about the rods 62 which are in turn rotatable about a vertical axis through the center of journals 46.

A yoke 70 is provided which includes a bar 72 extending in a direction opposite to a bifurcated member 74. The bar 72 passes through the slit 58 and is welded in place as at 75. An elongated operating handle 76 is secured between the tines of the bifurcated member 74 by a bolt 78 for rotation about a horizontal axis substantially perpendicular to the plane of the door.

A hasp 80 is mounted to the outer face of door 28 at the same vertical height as and spaced laterally from the point at which the handle 76 is hinged to the locking bar 48. The hasp is of conventional construction and includes a projection 82 and a keeper lip 84 rotatable about a horizontal axis at a cylindrical projection 86.

In use, when the door 28 is open, the handle 76 depends from the bolt 78 in a vertical downward direction. To lock the door, the handle 76 is raised to a position substantially perpendicular to the vertical axis about which the locking bar rotates. The handle is then first rotated in a direction away from the door, see FIG. 3, and the latching lip 50 is inserted into the keeper recess 24 as the door 28 is pushed toward the doorway. Rotation of the handle towards the door rotates the locking bar about its vertical hinge axis and the substantially flat latching surface 52 of latching lip 50 consequently engages the substantially flat surface 26 of the keeper recess 24 thereby bearing against each other, and drawing the door 28 into the doorway with a positive locking pressure which acts to uniformly compress the sealing strip 34 between the door and the frame.

Figure 2:
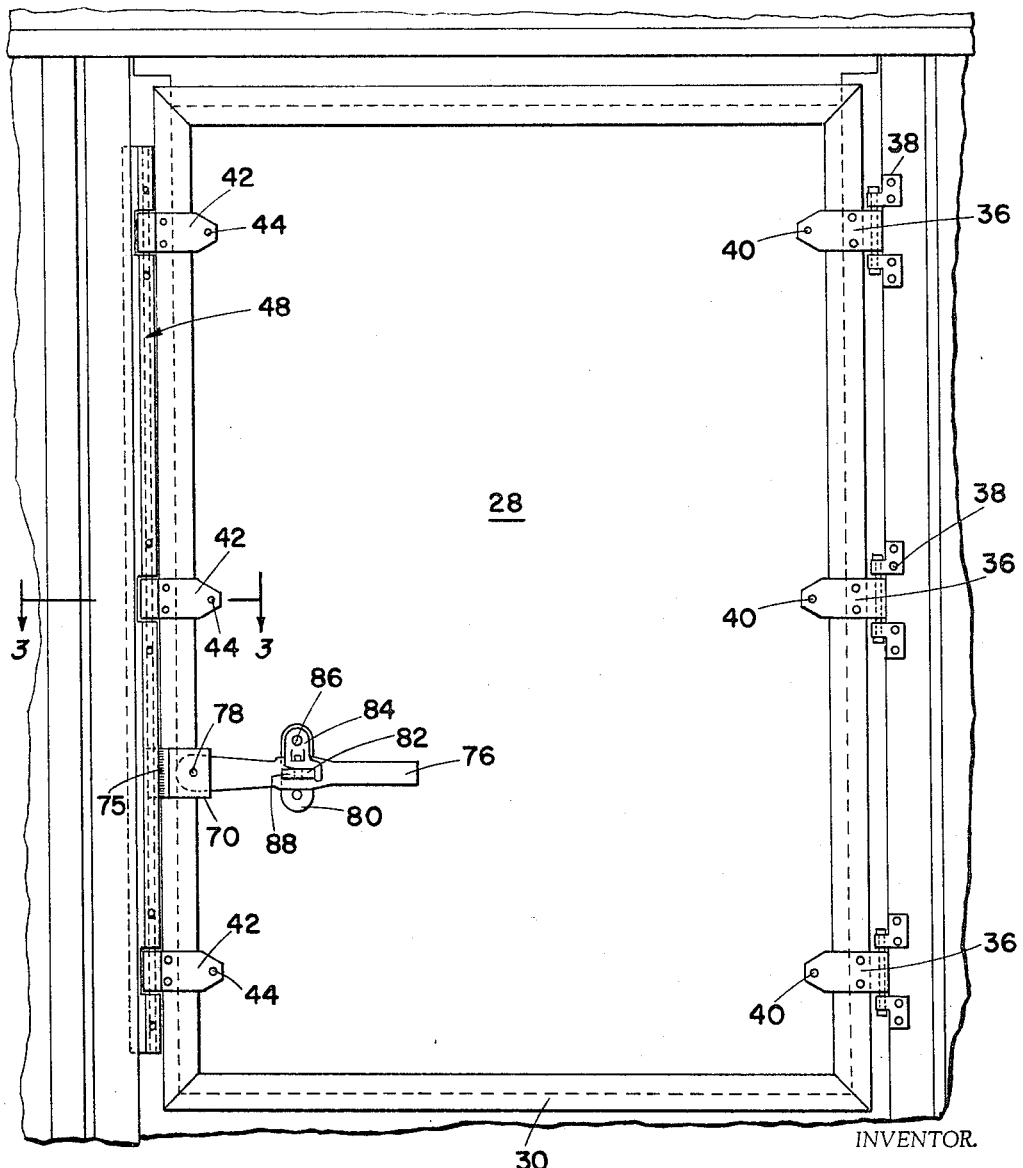
FIG. 2 is an enlarged fragmentary side elevational view of a door embodying the instant invention.
Figure 5:
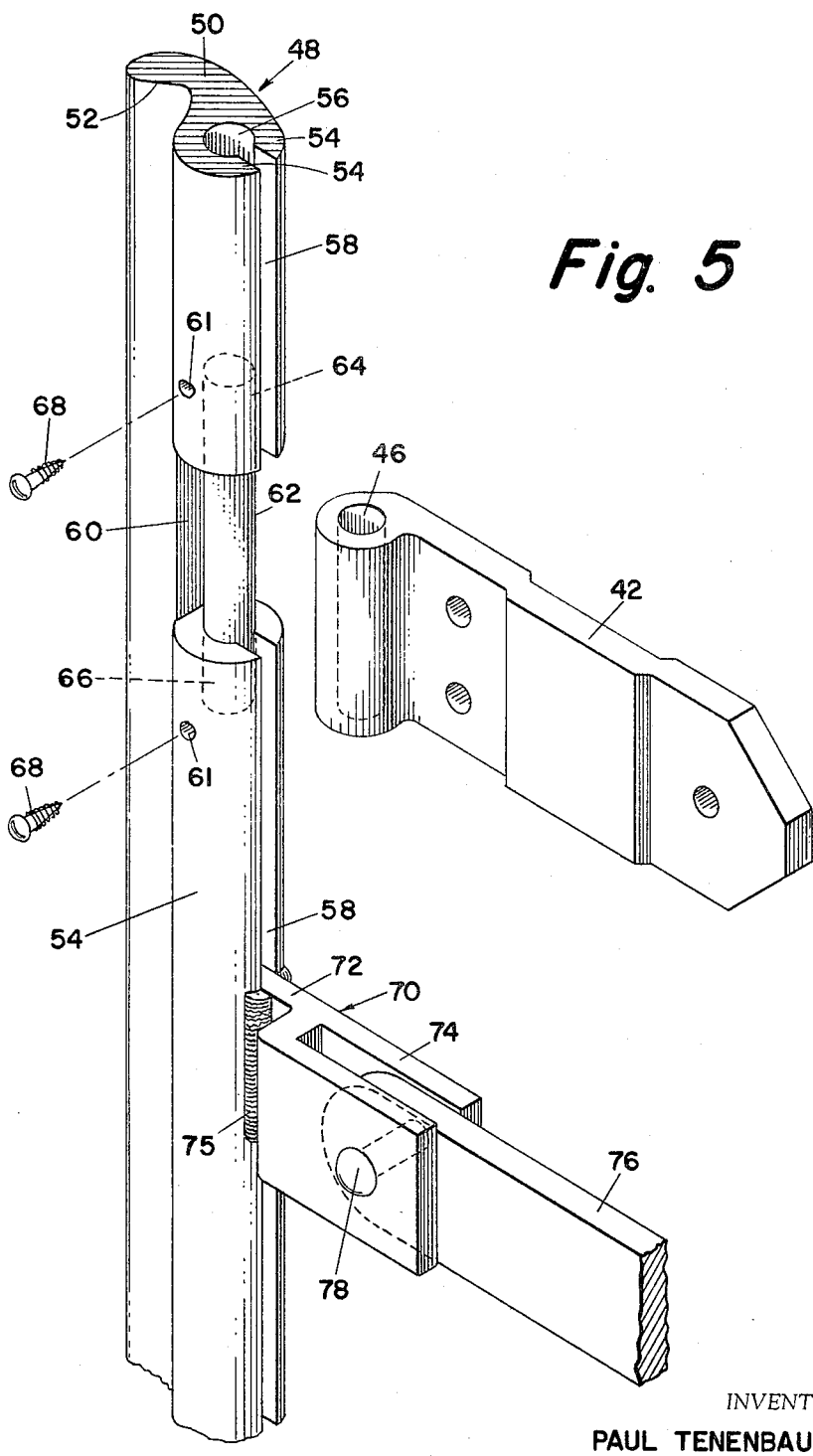
FIG. 5 is an enlarged fragmentary partially exploded perspective view of the locking bar of the instant locking mechanism.

In the final locked position, the slot 88 in the handle 76 receives the projection 82 of the hasp 80 and the keeper lip 84 thereof is rotated to a position (note FIG. 2) in which the hasp secures the handle in a fixed position. In this position, and in fact before this ultimate position has been attained, the rubber sealer 34 is considerably compressed to produce a very effective watertight seal. Thus, an effective locking action is obtained without the necessity of providing close lateral tolerances between the door and the doorway.

While a preferred embodiment of the invention has here been shown and described, it will be understood that skilled artisans may make mirror variations without departing from the spirit of the invention and the scope of the appended claims.

I claim:

1. In a vehicle body having a doorway, a frame thereabout and a door movable into position to cover said doorway, a locking mechanism comprising a vertically extending member constituting one portion of said frame, a vertically extending keeper recess in said member opening towards said door and along said body and including a substantially flat surface facing said body, a locking bar hinged to said door about a vertical axis and including a lip extendable into said recess and having a substantially flat surface adapted to engage said flat surface of said keeper recess, and a handle secured to said bar to rotate the same about its hinge axis and towards said door to effect the locking action wherein said flat surfaces bear against each other and exert a force pressing said door into said doorway, said flat surfaces of said recess and lip being substantially as long as said door.

2. The combination of claim 1 and a compressible rubber sealer secured either to said frame or to said door adjacent and coextensive with the periphery thereof so that when said door is pressed into said doorway, said sealer is compressed between said door and said frame.

3. For use in a locking mechanism for a vehicle body having a doorway, a frame thereabout having a lateral extending keeper recess therein formed with a substantially flat surface and a door movable into position to cover said doorway, a locking bar hinged about a vertical axis to said door and comprising a collar encompassing said vertical axis, a latching lip substantially as long as said door and extending laterally from said collar and having a substantially flat surface adapted to be inserted in said keeper recess, and a handle secured in said collar and extending laterally therefrom in a direction opposite said lip, said handle adapted to effect rotation of said bar about its hinge axis so that said flat surface of said latching lip engages said flat surface of said recess thereby exerting a force which presses said door into said doorway.

4. In a vehicle having a side wall and a rectangular opening therein defining a doorway, a door substantially coextensive with said doorway, a compressible sealer attached about a face of said door or doorway, a keeper coextending along a vertical edge of said doorway including a recess having a substantially flat surface facing said side wall and extending angularly inwardly toward said doorway, an elongated locking bar pivoted to said door for movement about a vertical axis including a handle for rotating said bar and a lateral lip having a substantially flat surface facing away from said side wall and coextensive with said keeper so that when said handle is moved towards said door said lip enters said keeper and said flat surfaces of said keeper recess and lip engage thereby placing the door in a position to close said doorway while compressing said sealer between said door and said side wall.

5. In a vehicle having a side wall constructed of longitudinally spaced vertical posts, a vertically spaced pair of horizontal rails and sheets secured therebetween, said sheets being discontinued between a pair of posts to define a doorway, said pair of posts and said rails forming a frame for said doorway, a door substantially coextensive with said frame, a compressible sealer attached to a face of said door or doorway adjacent to and coextensive with the periphery thereof, a recess in one post of said frame substantially as long as said post and opening laterally thereof towards said doorway, said recess including a substantially flat surface facing said side wall, a locking bar pivoted about a vertical axis to said door and including a laterally extending latching lip substantially as long as said keeper recess and having a substantially flat surface facing away from said side wall, and a handle extending laterally from said bar in a direction opposite to said lip so that upon rotation of said handle towards said door, said flat surface of said lip engages said flat surface in said recess thereby closing said door in said doorway while compressing the sealer between said door and said frame.

6. In a vehicle body having a doorway, a frame thereabout and a door movable into position to cover said doorway, a locking mechanism comprising a vertically extending member constituting one portion of said frame, a vertically extending keeper recess in said member opening towards said door and along said body and including a surface facing said body, a locking bar hinged to said door about a vertical axis and including a lip extendable into said recess and having a surface adapted to engage said surface of said keeper recess, said keeper recess and lip surfaces being substantially as long as said door, and a handle secured to said bar to rotate the same about its hinge axis and towards said door to effect the locking action wherein said surfaces bear against each other and exert a force pressing said door into said doorway.

7. In a vehicle body having a doorway, a frame thereabout and a door movable into position to cover said doorway, a locking mechanism comprising a vertically extending member constituting one portion of said frame, a vertically extending keeper recess in said member opening towards said door and along said body and including a substantially flat surface facing said body, a locking bar hinged to said door about a vertical axis and including a lip extendable into said recess and having a substantially flat surface adapted to extend along and engage said flat surface of said keeper recess wherein said flat surfaces bear against each other so that substantial uniform locking pressure is applied along the length of the door, and a handle secured to said bar to rotate the same about its hinge axis and towards said door to effect locking action, said flat surface of said keeper recess being inclined inwardly towards said doorway and said flat surface of said lip being correspondingly inclined outwardly into said recess when engaging said flat surface of said recess.

8. In a vehicle having a side wall constructed of longitudinally spaced vertical posts, a vertically spaced pair of horizontal rails and sheets secured therebetween, said sheets being discontinued between a pair of posts to define a doorway, said pair of posts and said rails forming a frame for said doorway, and a door movable into position to cover said doorway, one of said pair of doorway frame vertical posts being generally hat-shaped in cross-section and including a laterally extending keeper recess opening towards and along the side of the vehicle, said keeper recess being substantially as long as said door, and a latching means carried by said door having lip means receivable in said keeper recess, substantially along the length thereof.

References Cited by the Examiner
UNITED STATES PATENTS

| | | | |
|---|---|---|---|
| 1,160,758 | 11/1915 | Reinke. | |
| 1,536,110 | 5/1925 | Lewis. | |
| 1,538,581 | 5/1925 | O'Connor | 292—240 X |
| 1,685,175 | 9/1928 | O'Connor | 292—241 |
| 2,038,876 | 4/1936 | Sonabend | 292—218 |
| 2,634,997 | 4/1953 | Gallowitz. | |
| 2,861,830 | 11/1958 | Bennett | 292—218 X |
| 2,997,752 | 8/1961 | Henrikson et al. | 292—218 X |
| 3,099,473 | 7/1963 | Pastva | 292—218 X |

EDWARD C. ALLEN, *Primary Examiner.*

RICHARD E. MOORE, *Examiner.*